Patented Dec. 27, 1932

1,892,302

UNITED STATES PATENT OFFICE

PHILIP HERKIMER GROGGINS, OF WASHINGTON, DISTRICT OF COLUMBIA

PREPARATION OF ORGANIC COMPOUNDS OF THE ANTHRAQUINONE SERIES

No Drawing.   Application filed June 30, 1931.   Serial No. 548,043.

(GRANTED UNDER THE ACT OF MARCH 3, 1883, AS AMENDED APRIL 30, 1928; 370 O. G. 757)

This application is made under the act of March 3, 1883, as amended by the act of April 30, 1928 and the invention herein described, if patented, may be manufactured and used by or for the Government for governmental purposes without the payment to me of any royalty thereon.

I hereby dedicate the invention herein described to the free use of the public of and within the United States of America to take effect upon the granting of a patent to me.

This invention relates to the preparation of carbon compounds and more particularly to the preparation of amino derivatives of the anthraquinone series. It especially contemplates the ammonolysis of halogeno anthraquinones.

The invention has for an object the preparation of amino-anthraquinones by new chemical processes.

Other objects are the preparation of these compounds in a very pure state in high yields, by processes which are simple and which may be readily carried out. A still further object is an advancement of the art. Other objects will appear hereinafter.

These objects are accomplished by the treatment of halogeno-anthraquinones with strong aqueous solutions of ammonia in the presence of one or more inorganic oxidants. The invention also contemplates the optional use of a catalyst.

The invention will be further understood from a consideration of the following examples, in which the parts are given by weight:

Example I

*Preparation of beta-amino-anthraquinone*

In a suitable high pressure autoclave there was placed 36.5 parts of 2-chloro-anthraquinone, .72 parts of reduced copper, 6 parts of ammonium nitrate, and .6 parts of potassium chlorate. Thereafter 315 parts of 28% aqueous ammonia were added and the autoclave closed. The charge was heated to gradually raise the temperature to 185° C. This temperature was maintained for approximately 36 hours, after which the reaction mass was filtered and the solid material washed free from the mother liquor. 2-amino-anthraquinone of 97.5% purity was obtained. The yield was 94% of the theoretical.

Example II

*Preparation of beta-amino-anthraquinone*

To a mixture of 36.5 parts of beta-chloroanthraquinone, 6 parts of ammonium nitrate, 1 part of ammonium per-chlorate and .72 parts of cuprous oxide in an autoclave there was added 300 parts of 40% aqueous ammonia. After closing the autoclave the resultant mixture was heated in such a manner that the temperature was gradually raised to 180° C. This temperture was maintained for twenty hours. The reaction mass was thereafter transferred to a distillation apparatus, made alkaline with sodium hydroxide, and the excess of ammonia recovered by distillation. The residue remaining in the still was thereafter filtered and washed free from the mother liquor. The solid product obtained was beta-amino-anthraquinone having a purity of 98%. The yield was 96% of that theoretically possible. The amino compound gave a clear diazonium salt solution.

Example III

*Preparation of alpha-amino-anthraquinone*

Alpha-amino-anthraquinone was treated by the process set out in Example II with equally desirable results.

The invention is not limited to the exact details given in the above examples. In general the various chlorine substituted anthraquinone derivatives may be used satisfactorily. The results obtainable by using as starting substances such compounds as 1-nitro-5-chloro-anthraquinone, 1-nitro-6-chloro-anthraquinone, 1-nitro-7-chloro-anthraquinone, 1-nitro-8-chloro-anthraquinone, beta-chloro-anthraquinone, alpha-chloro-anthraquinone, 1:5-di-chloro-anthraquinone, 1:8-di-chloro-anthraquinone, 2:6-di-chloro-anthraquinone, 2:7-di-chloro-anthraquinone and the various nitro-di-chloro-anthraquinones, merit special mention.

The temperatures at which the processes of this invention are carried out, as will be obvious to one skilled in the art, depend upon the particular starting compound and the other ingredients of the reaction mass. In general the preferred temperature range is between 150° C. and 225° C.

In carrying out the process the chlorates may be replaced by other compounds, such as perborates, perchlorates, dichromates and the like. Very good results are obtained by replacing the chlorates with calculated quantities of salts of perchloric acid.

Because of its availability, potassium chlorate is generally used, but it is to be understood that the corresponding salts of other alkali metals give equivalent results.

In the examples ammonium nitrate has been used. This may be replaced with other alkali metal nitrates, for example, sodium nitrate.

The strength of the aqueous ammonium solution may be varied, but preferably the concentration is that corresponding to a 20 to 50% ammonia ($NH_3$) content. With decreasing concentration of the ammonia solution increasing temperatures may be used advantageously.

In general, for a given concentration of ammonia the use of higher temperatures results in completion of the reaction in a shorter time.

This invention is applicable to halogeno-anthraquinones in general. Bromo-anthraquinones also give very desirable results.

The invention is not limited to the use of metallic copper nor any particular copper salt as a catalyst. Other metals or metal salts, for instance, the salts of the metals or the metals themselves which follow copper in the electro-motive series are used advantageously. Special mention may be made of copper nitrate, cuprous oxide and silver chloride.

By the term "reduced copper" it is intended to cover metallic copper in any physical form, preferably precipitated copper in the form of a fine copper powder or sponge.

Throughout the specification and claims where the term "alkali metal" is used it is intended to cover the ammonium radical ($NH_4$)—, because it reacts similarly to the corresponding sodium and potassium compounds.

The process of this invention has several very important and distinct advantages over any other processes known to the prior art. Among these may be mentioned the fact that the yields of amino-anthraquinones obtained are substantially theoretical, the products of the process are so pure as to render unnecessary special or additional purification steps, the processes may be carried out at lower temperatures than heretofore deemed possible, and the quantities of materials per charge can be greatly increased in proportion to the ammonia content of the autoclave. This last mentioned advantage is of particular importance in commercial processes.

As many apparently widely different embodiments of this invention may be made without departing from the spirit and scope thereof, it is to be understood that I do not limit myself to the specific embodiments thereof except as defined in the appended claims.

I claim:

1. A process which comprises heating chloro-anthraquinone with aqueous ammonia in an autoclave under pressure in the presence of potassium chlorate and ammonium nitrate at a temperature of 150° C. to 225° C.

2. The process which comprises heating a chloro-anthraquinone with aqueous ammonia in an autoclave under pressure in the presence of chlorates, perchlorates and nitrates.

3. The process which comprises heating a chloro-anthraquinone with aqueous ammonia under pressure in the presence of an inorganic nitrate and a chlorate.

4. The process which comprises heating a chloro-anthraquinone with aqueous ammonia under pressure in the presence of an inorganic nitrate and an inorganic perchlorate.

5. The process which comprises heating a chloro-anthraquinone with aqueous ammonia under pressure in the presence of an alkali metal nitrate and an alkali metal chlorate.

6. The process which comprises heating a chloro-anthraquinone with aqueous ammonia under pressure in the presence of an inorganic oxidizing salt which is soluble in aqueous ammonia.

7. The process which comprises heating a chloro-anthraquinone with aqueous ammonia under pressure in the presence of ammonium nitrate and an inorganic oxidizing salt which is soluble in aqueous ammonia.

8. The process which comprises heating a chloro-anthraquinone with aqueous ammonia under pressure in the presence of ammonium nitrate and potassium chlorate.

9. The process which comprises heating a chloro-anthraquinone with aqueous ammonia under pressure in the presence of an inorganic oxidizing salt which is soluble in aqueous ammonia and a metal following hydrogen in the electrochemical series.

10. The process which comprises heating a chloro-anthraquinone with aqueous ammonia under pressure in the presence of an inorganic nitrate, and a chlorate, and a copper containing catalyst.

11. The process which comprises heating a chloro-anthraquinone with aqueous ammonia under pressure in the presence of an inorganic nitrate, a perchlorate, and a copper containing catalyst.

12. The process which comprises heating a chloro-anthraquinone with aqueous ammonia under pressure in the presence of ammonium nitrate, potassium chlorate and reduced copper.

13. The process which comprises heating a halogeno-anthraquinone with aqueous ammonia in a pressure system in the presence of an inorganic nitrate, a chlorate, and a copper containing catalyst.

In testimony whereof, I affix my signature.

PHILIP H. GROGGINS.